United States Patent
Qu et al.

(10) Patent No.: US 8,811,285 B2
(45) Date of Patent: Aug. 19, 2014

(54) CONTROL CHANNEL TRANSMISSION AND RECEPTION METHOD AND SYSTEM

(75) Inventors: Bingyu Qu, Schaumberg, IL (US); Weimin Xieo, Hoffman Estates, IL (US); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 123 days.

(21) Appl. No.: 13/396,529

(22) Filed: Feb. 14, 2012

(65) Prior Publication Data

US 2012/0207126 A1    Aug. 16, 2012

Related U.S. Application Data

(60) Provisional application No. 61/442,640, filed on Feb. 14, 2011.

(51) Int. Cl.
*H04W 4/00* (2009.01)
*H04B 7/212* (2006.01)
*H04B 7/208* (2006.01)

(52) U.S. Cl.
USPC .......................... 370/328; 370/337; 370/344

(58) Field of Classification Search
USPC .......... 370/319, 321, 328, 330, 334, 337, 347
See application file for complete search history.

(56) References Cited

U.S. PATENT DOCUMENTS

| | | | |
|---|---|---|---|
| 2008/0107047 A1 | 5/2008 | Olfat | |
| 2009/0201838 A1 | 8/2009 | Zhang et al. | |
| 2010/0020771 A1 | 1/2010 | Ji et al. | |
| 2010/0238821 A1 | 9/2010 | Liu et al. | |
| 2010/0281326 A1 | 11/2010 | Ahn et al. | |
| 2010/0297936 A1 | 11/2010 | Nan | |
| 2011/0034177 A1 | 2/2011 | Oh et al. | |
| 2011/0243009 A1* | 10/2011 | Chandrasekhar et al. | 370/252 |
| 2012/0039282 A1* | 2/2012 | Kim et al. | 370/329 |

(Continued)

FOREIGN PATENT DOCUMENTS

| | | |
|---|---|---|
| WO | WO 2011/013990 A2 | 2/2011 |
| WO | WO 2011/118993 A2 | 9/2011 |

OTHER PUBLICATIONS

International Search Report received in Patent Cooperation Treaty Application No. PCT/US2012/025128, mailed Apr. 26, 2012, 2 pages.

(Continued)

*Primary Examiner* — Andrew Lee
(74) *Attorney, Agent, or Firm* — Slater & Matsil, L.L.P.

(57) ABSTRACT

In an embodiment method, a central controller of a wireless system selects a common reference signal ("CRS") pattern for muting on a first type of control channel by the central controller, wherein the first type of control channel is formed with resource elements ("REs"). The central controller identifies, for a set of user equipments ("UEs") in a serving area of the central controller, a set of subframes including the first type of control channel, wherein the set of subframes has REs that overlap the CRS pattern for muting. The central controller mutes the overlapping REs in the first type of control channel, and frequency-division multiplexes the first type of control channel with data channels. The central controller transmits, to the set of UEs, the first type of control channel with the muted REs on the identified set of subframes.

24 Claims, 6 Drawing Sheets

(56) References Cited

U.S. PATENT DOCUMENTS

| | | | | |
|---|---|---|---|---|
| 2012/0058791 | A1* | 3/2012 | Bhattad et al. | 455/509 |
| 2012/0106374 | A1* | 5/2012 | Gaal et al. | 370/252 |
| 2013/0070719 | A1* | 3/2013 | Xu et al. | 370/329 |
| 2013/0208678 | A1* | 8/2013 | Zhang | 370/329 |
| 2013/0215857 | A1* | 8/2013 | Wu et al. | 370/329 |
| 2013/0279359 | A1* | 10/2013 | Zhang et al. | 370/252 |
| 2013/0294271 | A1* | 11/2013 | Nagata et al. | 370/252 |

OTHER PUBLICATIONS

Written Opinion of the International Searching Authority received in Patent Cooperation Treaty Application No. PCT/US2012/025128, mailed Apr. 26, 2012, 7 pages.

"Impact of CRS interference," 3GPP TSG RAN WG1 Meeting #62bis, R1-105353, Xi'an, China, Oct. 11-15, 2010, Agenda item: 6.8.1.2, pp. 1-8.

"3$^{rd}$ Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331, Dec. 2011, V10.4.0, 296 pages.

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, Dec. 2012, V10.4.0, 125 pages.

"3$^{rd}$ Generation Partnership Project; Technical Specification Group Radio Access Network; Evolved Universal Terrestrial Radio Access (E-UTRA); Physical channels and modulation (Release 10)," 3GPP TS 36.211, Dec. 2011, V10.4.0, 101 pages.

Alcatel-Lucent Shanghai Bell, "Considerations on MCCH transmission scheme," 3GPP TSG-RAN WG2 #66, R2-093094, Agenda Item: 6.3.2, May 4-8, 2009, 5 pages.

LG Electronics, "Considerations on measurement mismatch problem," 3GPP TSG RAN WG1 Meeting #63bis, R1-110545, Agenda Item: 6.2.6, Jan. 17-21, 2011, 5 pages.

"Extended European Search Report," Application No. 12746606.8, Applicant: Huawei Technologies Co., Ltd., Oct. 28, 2013, 8 pages.

Qualcomm Incorporated, "Link performance of DL control channels and PDSCH in presence of CRS interference," 3GPP TSG-RAN WG1 #63, R1-106382, Agenda Item: 6.8.1.2, Nov. 15-19, 2010, 6 pages.

CMCC, "Summary of the description of candidate eICIC solutions," 3GPP TSG-WG1 #62, R1-105081, Agenda Item: 6.8.1, Aug. 23-27, 2010, 6 pages.

"Communication Pursant to Article 94(3) EPC," Application No. 12746606.8, Applicant: Huawei Technologies Co., Ltd., mailing date: Apr. 24, 2014, 7 pages.

Motorola, "Joint and Separate L1/2 control channel coding," 3GPP TSG RAN1 LTE Ad Hoc, R1-061728, Discussion, Agenda Item: 6.3.2, Jun. 27-30, 2006, 6 pages.

NTT DoCoMo, et al., "L1/L2 Control Channel Structure for E-UTRA Downlink," 3GPP TSG RAN WG1 Meeting #45, R1-061544, Discussion and Decision, Agenda Item: 11.1.1, May 8-12, 2006, 18 pages.

NTT DoCoMo, et al., "Multiplexing Method of Downlink L1/L2 Control Channel with Shared Data Channel in E-UTRA Downlink," 3GPP TSG RAN WG1 Meeting #47, R1-063323, Discussion and Decision, Agenda Item: 6.12.2, Nov. 6-10, 2006, pp. 1-12.

Panasonic, "Multiplexing and Link Adaptation of Downlink L1/L2 Control Signaling," 3GPP TSG-RAN WG1 Meeting #47, R1-063186, Discussion and Decision, Agenda Item: 6.12.2, Nov. 6-10, 206, pp. 1-8.

* cited by examiner

CONTROL CHANNEL TRANSMISSION AND RECEPTION METHOD AND SYSTEM

This application claims the benefit of U.S. Provisional Application No. 61/442,640 filed on Feb. 14, 2011, entitled "Control Channel Transmission and Reception Method and System," which application is hereby incorporated herein by reference.

TECHNICAL FIELD

The present invention is directed, in general, to communication systems and, in particular, to an apparatus, method, and system for employing a first and a second type of control channel in a wireless communication system.

BACKGROUND

The use of wireless devices, such as cellular telephones, laptops, PDAs, and the like, has exploded over the last couple decades in both the consumer market as well as the business market. Generally, wireless devices include a transceiver and communicate with other transceivers using a variety of communication protocols. For example, WiFi networks are popular in homes and businesses and provide a user of a compatible wireless device wireless access to the Internet. WiFi networks are based on the IEEE 802.11 standard and provide short range connectivity. Many wireless devices are also compatible with one or more cellular networks to provide broader, longer range coverage. For example, many wireless devices communicate wirelessly to networks utilizing a Global Systems for Mobile Communications ("GSM") or Code Division Multiple Access ("CDMA") standard.

These communications standards used by wireless devices are constantly evolving to provide greater services, including new features as well as better service. For example, the current standard being developed by the 3rd Generation Partnership Project ("3GPP") is the Long Term Evolution ("LTE") standard. LTE is often marketed in the United States as "4G" and is often the subject of marketing campaigns by service providers. LTE is designed to provide greater throughput and higher speeds for users as well as providing a simpler architecture resulting in lower operating costs for service providers. Three previous versions of LTE (Rel-8, Rel-9 and Rel-10) have already been standardized, and the 3GPP is now working on Rel-11.

SUMMARY OF THE INVENTION

Embodiments provide a wireless system and a method for its operation. A first central controller of the wireless system selects a common reference signal ("CRS") pattern for muting on a first type of control channel by the first central controller, the first type of control channel formed with resource elements ("REs"), identifies, for a first set of user equipments ("UEs") in a serving area of the first central controller, a set of subframes including the first type of control channel, the set of subframes having REs that overlap the CRS pattern for muting, mutes the overlapping REs in the first type of control channel, frequency-division multiplexes the first type of control channel with data channels, and transmits, to the first set of UEs, the first type of control channel with the muted REs on the identified set of subframes.

Further embodiments provide a user equipment and a method for its operation. The user equipment is configured to receive, from a first central controller, a first type of control channel formed with resource elements ("REs"), the first central controller having selected a CRS pattern for muting on the first type of control channel, and having identified a set of subframes having the first type of control channel, the set of subframes having REs that overlap the CRS pattern for muting, and the first central controller having muted the overlapping REs in the first type of control channel. The user equipment is further configured to disable reception of the muted REs of the first type of control channel, and receive a data channel frequency-division multiplexed with the first type of control channel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
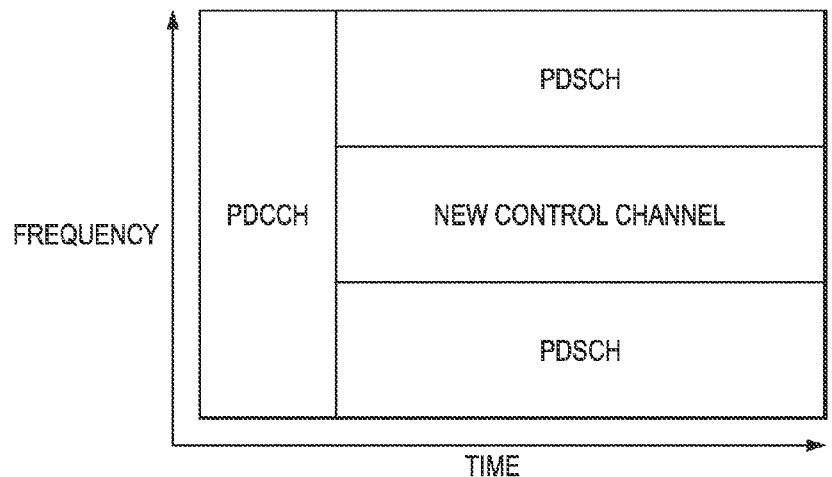
FIG. 1, illustrates a subframe formed with a physical downlink control channel ("PDCCH"), physical downlink shared channel ("PDSCH"), and a new control channel in accordance with an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

Generally, in addition to possibly transmitting a first type of control channel, referred to herein as a PDCCH, in a wireless system, a second type of control channel, referred to herein as an enhanced PDCCH ("ePDCCH"), is transmitted, and the second type of control channel is characterized in that resource elements ("REs") in a CRS pattern employed therein are not used for transmission REs, i.e., data information, of the second type of control channel, while the first type of control channel has no such constraint about CRS patterns.

A reception method of a control channel is introduced, including detecting a first type of control channel in a first subframe and detecting a second type of control channel in a second subframe, wherein REs in a CRS pattern are not used for transmission of the second type of control channel.

For LTE Release-10 and earlier cellular systems, both a physical downlink control channel ("PDCCH") and a physical downlink shared channel ("PDSCH") are defined. A PDCCH is used to carry control information of PDSCH, such as resource allocation information, modulation, and coding information, etc. A PDSCH is used to carry data information. A PDCCH is located in the first several symbols in a subframe (one to four). The first several symbols carrying the PDCCH may be referred to as a control domain. Other symbols are used to carry data transmission, and may be referred to as the data domain. Hence, PDCCH is located in the control domain and PDSCH is located in the data domain.

In the control domain, there can be other control channels, such as the physical hybrid indicator channel ("PHICH"), which is used to transmit an acknowledgment/negative acknowledgment ("ACK/NACK") in response to uplink data transmission, or the physical control format indicator channel ("PCFICH"), indicating the number of symbols of control domain in a subframe.

A new type of control channel (or new control channel) located in the data domain of a subframe is introduced herein for systems operating under LTE-A Release 11 or beyond. One or more resource blocks ("RBs") can be allocated to a UE to carry control information of a PDSCH or control information of a physical uplink shared channel ("PUSCH"), such as uplink ("UL") grant information or ACK/NACK information in response to a PUSCH transmission. This channel may be referred to as the U-PDCCH for a type of UL grant or downlink ("DL") grant channel, U-PHICH for a type of PHICH. Note that when the control channel U-PDCCH is present, the control channel PDCCH may or may not be present.

There are some benefits to having such a U-PDCCH/U-PHICH. For example, different cells may allocate an orthogonal time-frequency resource for the U-PDCCH/U-PHICH; thus, the interference between the U-PDCCH/U-PHICHs of different cells is significantly lowered. Another benefit can be that a dedicated reference signal can be used for the U-PDCCH/U-PHICH. In other words, a U-PDCCH/U-PHICH has its own reference signal for channel estimation during demodulation, thereby allowing a more advanced transmission scheme, such as beam forming or precoding.

Turning now to FIG. 1, illustrated is a subframe formed with the PDCCH, PDSCH, and the new control channel ("U-PDCCH/U-PHICH"), in accordance with an embodiment. The new control channel can include a new control channel to indicate carrier control information for PDSCH and/or a new PHICH channel to indicate ACK/NACK for PUSCH. Note that this representation is logical and may not actually map to the specific physical resources as shown in FIG. 1 but to any resource blocks in the data domain. A U-PDCCH/U-PHICH is located in the data domain. The PDCCH/PHICH is located in the control domain.

There may still be significant interference on the U-PDCCH/U-PHICH from the CRSs transmitted by neighboring evolved NodeBs ("eNBs"). Furthermore, there are some constraints on the U-PDCCH/U-PHICH for coordinated multipoint transmission/reception ("CoMP") transmission due to CRS. CRS is a common reference signal, which can be used for PDCCH demodulation and can also be used for channel estimation of PDSCH in the transmission mode of transmission diversity.

Figure 2:
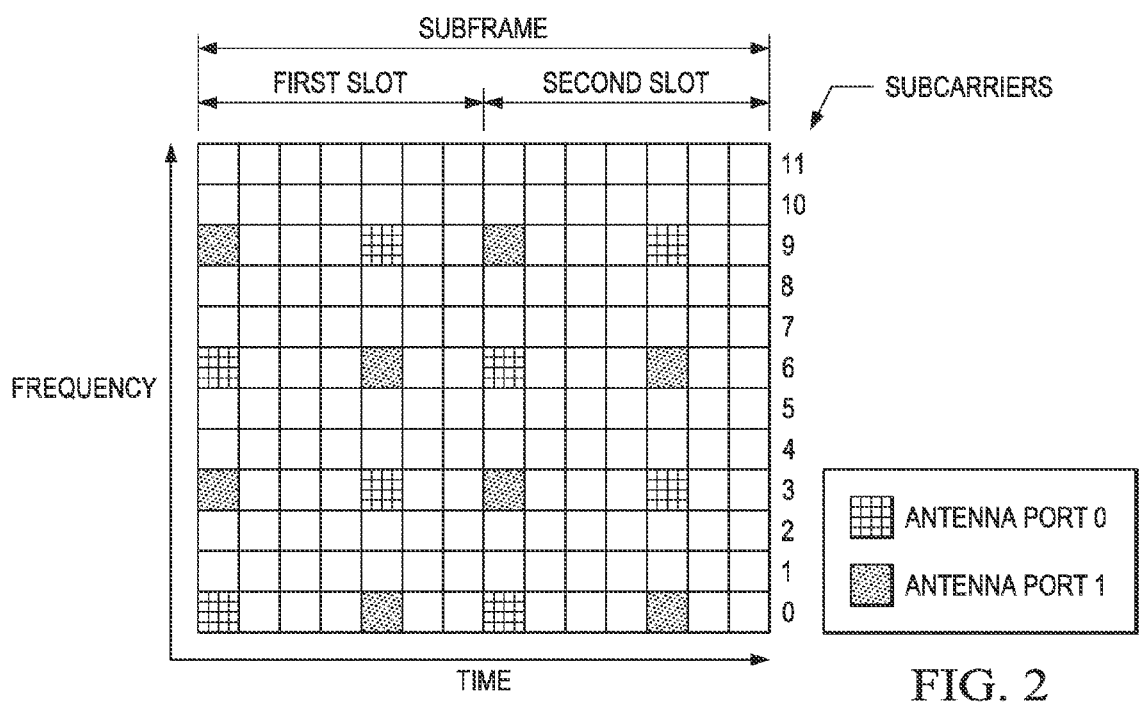
FIG. 2 illustrates a common reference signal ("CRS") pattern in LTE with frequency shift 0, in accordance with an embodiment.
Figure 3:
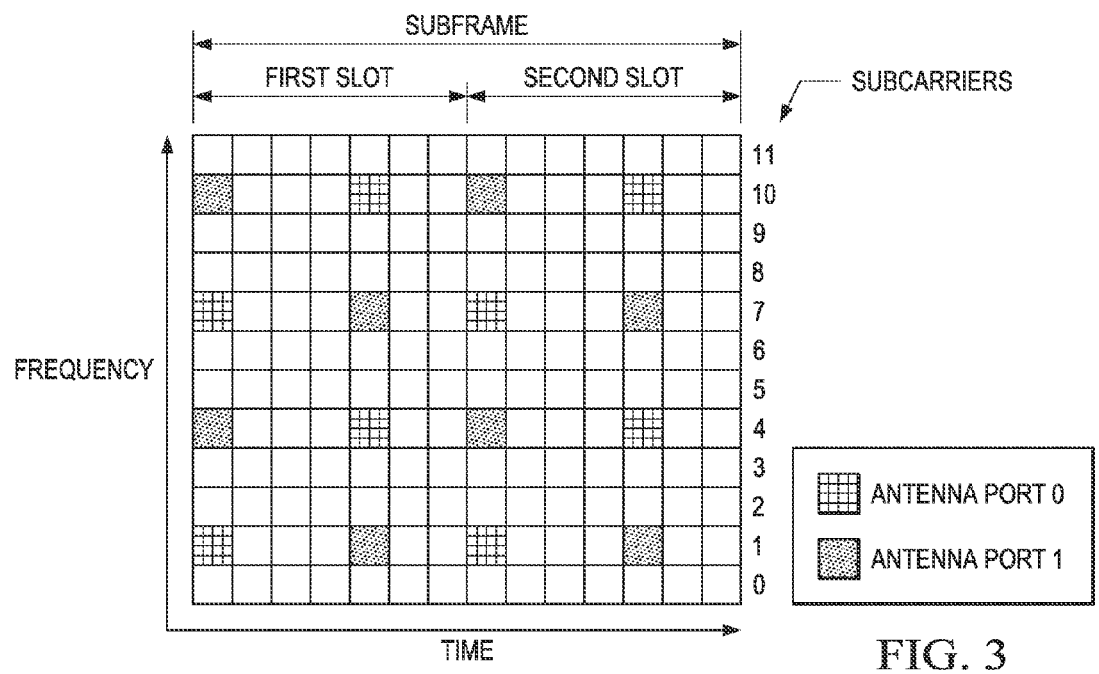
FIG. 3 illustrates a one-subcarrier shifted version of the CRS pattern illustrated in FIG. 2, in accordance with an embodiment.

Turning now to FIG. 2, illustrated is a CRS pattern in a resource block with frequency shift 0 in a subframe, in accordance with an embodiment. In FIG. 3, illustrated is a CRS pattern in a RB for a subframe with frequency shift 1, in accordance with an embodiment. CRS is transmitted in the entire frequency band of the system.

As illustrated in FIG. 2, a subframe consists (over time) of 14 OFDM symbols for a normal cyclic prefix length. A subframe is divided into two slots. A slot has seven OFDM symbols, with indices 0, 1, 2, 3, 4, 5, 6. A radio frame includes, without limitation, ten subframes. Resources are divided into multiple frames in the time domain. In the frequency domain, the resource is divided into multiple resource blocks. A resource block consists of 12 subcarriers with indices from 0 to 11 from low frequency to high frequency, as illustrated in FIGS. 2, 3, 4, and 5. A subcarrier in an OFDM symbol is a resource element ("RE"). REs for antenna port 1 are obtained by shifting REs for antenna port 0 in the frequency domain, where the shift offset is three subcarriers.

There are CRS REs in the data domain, CRS in symbol #4 in the first slot of a subframe, and symbol #0 symbol #4 in the second slot of a subframe for a normal subframe.

As illustrated in FIG. 3, a CRS pattern is a one-subcarrier-shifted version compared with the CRS pattern illustrated in FIG. 2. In an OFDM symbol carrying the CRS, subcarriers #0, #3, #6, #9 are REs of CRS in FIG. 2, but subcarrier #1, #4, #7, #10 are REs of CRS in FIG. 3. Usually different patterns (frequency shifts) can reduce interference among CRSs of different cells and hence different patterns can be configured for different cells Suppose cell 1 has the CRS pattern with frequency shift 0 in FIG. 2, and cell 2 has the CRS pattern with frequency shift 1 in FIG. 3. The RE in cell 1 with symbol #4 and subcarrier #1 is then interfered by the RE of CRS in cell 2 with symbol #4 and subcarrier #1.

Hence, there may be interference from CRS of neighbor cells to the control channel even though a new control channel is located in the data domain of a subframe if neighboring cells have different CRS patterns (different shifts in frequency domain). The new control of a UE may use one or more RBs, and CRSs are usually transmitted on the entire frequency band.

A subframe can be configured as a multicast broadcast single frequency network ("MBSFN") subframe by a higher layer to avoid transmission of CRS in the data domain in a neighbor cell since there is no CRS transmitted in the data domain of a MBSFN subframe. In this case, there will be no CRS interference to the new control channel in the data domain from neighboring cells. However, in some cases, such as for a subframe with PBCH (primary broadcast channel), transmission may not be configured as an MBSFN subframe. For frequency division duplex ("FDD"), subframes 0, 4, 5, and 9 may not be configured as MBSFN.

Another scenario is that the channel to carry an ACK/NACK in response to PUSCH, such as a U-PHICH/PHICH channel, can be transmitted once for every eight subframes to indicate whether a retransmission is needed or not and if a synchronized uplink non-adaptive transmission for PUSCH is configured. Non-adaptive means a resource allocation and modulation/coding scheme for retransmission in the process of HARQ has been determined by the initial transmission. Broadcasting signaling can have different periodicity with a new PHICH channel. In other words, broadcasting signaling may not be transmitted once for every eight subframes. Hence, there can be broadcasting signaling being transmitted in the same subframe of a neighboring cell as a new PHICH channel in the current cell. The simultaneous transmission may not always be avoided in a subframe for a new PHICH in the current cell and broadcasting signaling a neighboring cell. Since CRSs can be used for broadcasting signaling transmission, U-PHICH can be interfered by CRSs of neighboring cells if the CRSs of neighboring cells have a different frequency shift than the current cell. This is a configuration that is generally useful since the different frequency shift for CRSs improves the signal to interference ratio on the reference sequence. Thus, it is generally not desirable to configure all the neighboring cells to have the same frequency shift. Otherwise, the demodulation performance of the broadcast signaling may not be acceptable. A different frequency-shifted CRS for different cells may make joint transmission of multiple cells hard to be used.

Since some resource elements are used for CRSs in one cell but are used for U-PDCCH/U-PHICH in another cell, it may be difficult to transmit jointly processed signals from both cells for the new control channel on these REs.

For example, a RE in a cell is used to transmit a CRS (for example, symbol #4, subcarrier #0) in FIG. 1, but the RE in the same time-frequency position in another cell is used to transmit the new control channel instead of a CRS as described in FIG. 2 (symbol #4, subcarrier #0). In this case, joint transmission cannot be applied on this RE.

A transmission method of the new control channel may be characterized by transmitting a control channel in resource elements that do not belong to resource elements of a CRS pattern. The system can simultaneously support the legacy PDCCH/PHICH channel, although this is not a mandatory requirement. The inner-cell UEs can use the legacy PDCCH/PHICH channel in the control domain to have a larger number of control channels.

The CRS pattern(s) for which REs are not used for U-PDCCH/U-PHICH can be signaled by higher-layer signaling, for example, radio resource control ("RRC") signaling. Alternatively, REs in CRS pattern(s) not being used for the new control channel can be predefined or pre-specified in a standard. Also, it is possible to have fully dynamic signaling, e.g., using the common search space of the PDCCH, although this may be high overhead.

The U-PDCCH/U-PHICH can be a control channel to carry the control information for PDSCH. The U-PDCCH/U-PHICH can also be a control channel to carry uplink grant information of a PUSCH. The control channel can also be a PHICH channel to carry ACK/NACK feedback information in response to a PUSCH transmission.

The CRS patterns signaled, predefined, or pre-specified can be, without limitation, 0, 1, 2, or 3 CRS patterns and can be the same across a number of subframes with configured U-PDCCH/U-PHICH or can be different for different sets of subframes with configured U-PDCCH/U-PHICH. Signaling "0" means no CRS patterns are excluded for a new control channel transmission. Signaling "1" means one CRS pattern is excluded for a new control channel transmission, etc. For example, if a subframe is configured as an MBSFN subframe, all REs in the data domain can be used for a new control channel transmission. If a CRS pattern in a neighbor cell severely interferes with a current UE, a CRS pattern can still be signaled for the UE to avoid using REs in the CRS pattern for the new control channel to transmit. Thus, a CRS pattern for muting REs is signaled, predefined, or pre-specified. A CRS pattern for muting can be the same as or can be different from a CRS pattern for transmitting CRSs. By default, when there is no signaling, etc., to indicate a CRS pattern not being used for U-PDCCH/U-PHICH transmission, a UE may assume no extra CRS patterns for muting REs except the configured CRS pattern in the current cell for channel estimation (if so configured). In other words, an eNB may not transmit any signaling to indicate CRS patterns when there are no extra CRS patterns for muting REs. A simple bitmap method can be used for indication of a CRS pattern(s). For example, three bits, $a_1 a_2 a_3$, can be used to indicate three CRS patterns. The bit value "0" of bit $a_i$ indicates REs in pattern i, i=1, 2, 3, are not muted, and the bit value "1" of bit $a_i$ represents REs in pattern i, i=1, 2, 3, are muted. Being muted by a CRS pattern for muting means no U-PDCCH/U-PHICH is transmitted in those REs. The signaling can indicate in which subframes there are CRS patterns for muting, for example, the offset and/or period of subframes with CRS patterns for muting.

A CRS patterns for muting is signaled to not transmit a new control channel. Thus, REs in a CRS pattern are muted for the new control channel. The REs in a CRS patterns for muting may or may not be used to transmit a data channel. Thus, the muting of some REs in a data channel can be different from the muting of some REs in the new control channel. For a data channel, higher throughput is preferable but for a control channel, better performance is preferable.

The signaling of a CRS pattern for muting can be broadcast signaling or UE-dedicated signaling. The signaling can be higher-layer signaling, such as RRC signaling or physical layer signaling, etc. A CRS pattern for muting can be the same as or can be different from a CRS pattern for transmitting CRSs.

Note that the CRS muting can be different than the channel state information-reference symbol ("CSI-RS") muting technique that was standardized for E-UTRA Rel-10: CSI-RS muting can be configured for the entire bandwidth, whereas CRS muting can be configured on a per-resource-block basis. As a consequence for different RBs, a different set of REs can be muted, in other words, not used to transmit a signal.

Figure 4:
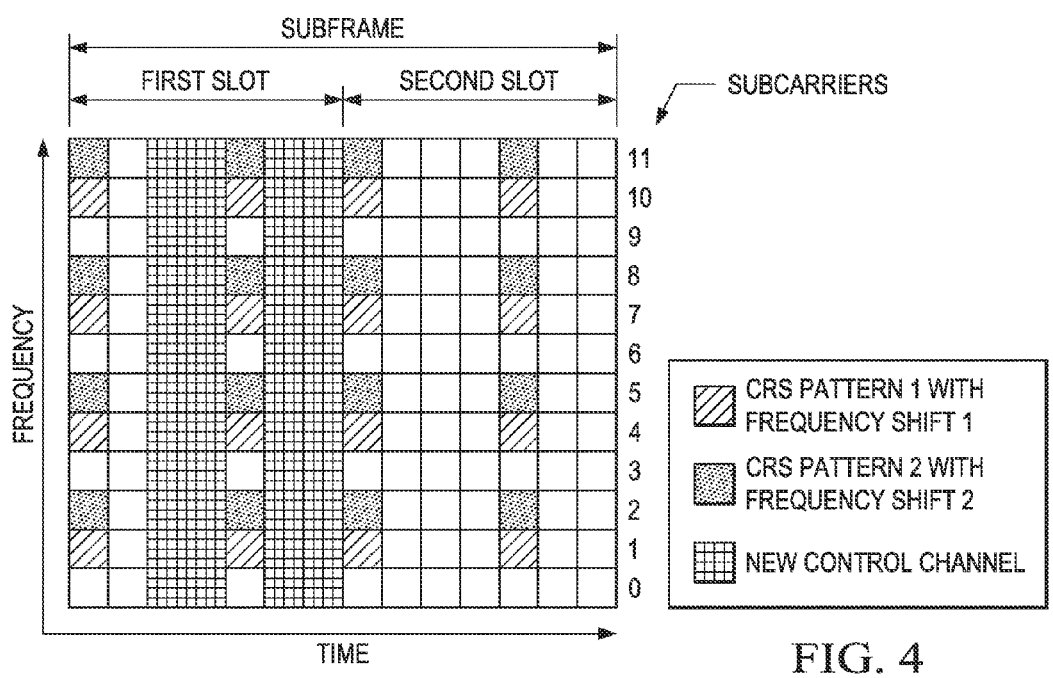
FIG. 4 illustrates a subframe including a CRS pattern 1 with frequency shift 1, a CRS pattern 2 with frequency shift 2, and resource elements of the new control channel, in accordance with an embodiment.

Turning now to FIG. 4, illustrated is a subframe including a CRS pattern 1 with frequency shift 1, a CRS pattern 2 with frequency shift 2, and resource elements of the new control channel, in accordance with an embodiment. Assume that the CRS pattern with frequency shift 1 (the diagonally-lined REs in FIG. 4) is for a current CRS transmission and that a neighboring cell with the CRS pattern with frequency shift 2 (the darkened REs in FIG. 4) is creating severe interference. The resource elements of the CRS patterns with frequency shift 1 and frequency shift 2 are not allocated to the U-PDCCH/U-PHICH. The CRS pattern with shift 1 for CRS of the current cell is known for UEs in the current cell. Some signaling to inform the UE(s) that the CRS pattern with frequency shift 2 is used in the neighboring cell can be used to reduce interference. Assume that the first two symbols (#0, #1) are used for the control domain. Symbols (#2, #3, #4, #5, #6) in the first slot of a subframe then can be used for U-PDCCH/U-PHICH. Another alternative is to use symbols (#0, #1, #2, #3, #4, #5, #6) in the second slot for U-PDCCH/U-PHICH, particularly for U-PHICH, since the timing requirement for PUSCH transmission based on the received ACK/NACK in the U-PHICH is a little looser compared with the DL-grant. U-PDCCH of the UL grant can be in the second slot also based on the similar reason to U-PHICH. The resource elements in a resource block not being used by CRS patterns with shift 1 and shift 2 are used for U-PDCCH/U-PHICH. Depending on different coding rate requirements for performance, one or more RBs can be allocated for the U-PDCCH/U-PHICH of a UE. Some of the resource elements for the U-PDCCH/U-PHICH can be used for a dedicated reference signal of the new control channel.

Figure 5:
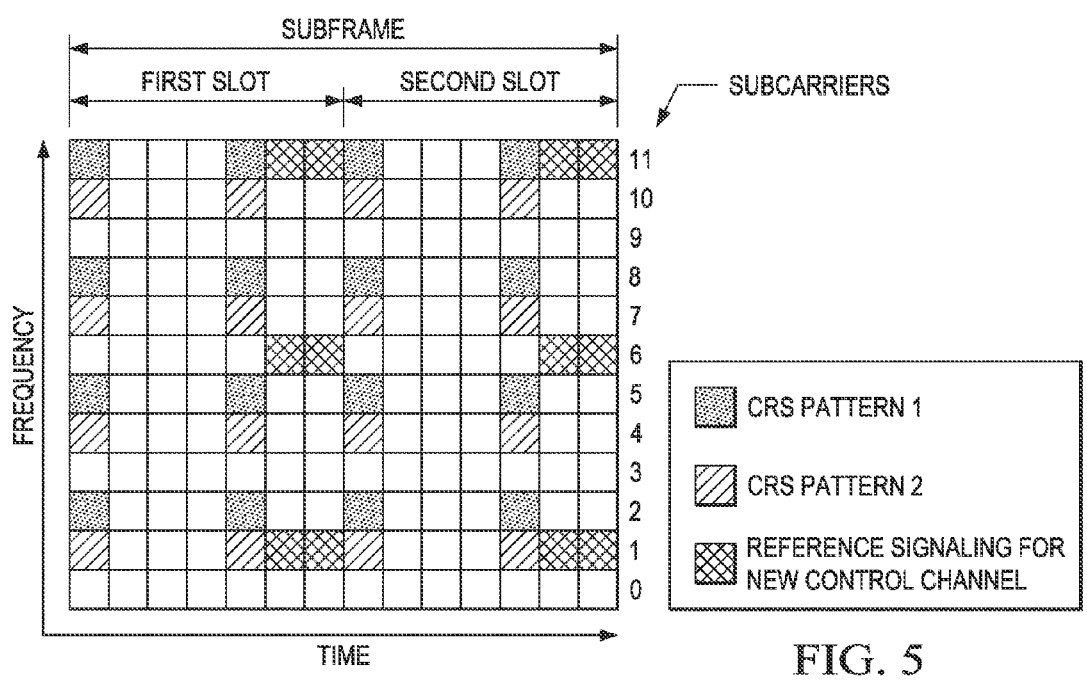
FIG. 5 illustrates a subframe including a CRS pattern 1 with frequency shift 1, a CRS pattern 2 with frequency shift 2, and REs employed for reference signaling for the new control channel, in accordance with an embodiment.

Turning now to FIG. 5, illustrated is a subframe including a CRS pattern 1 with frequency shift 1, a CRS pattern 2 with frequency shift 2, and REs employed for reference signaling for the new control channel, in accordance with an embodiment. As illustrated in FIG. 5, some REs in the first slot (the first 7 symbols) are dedicated reference signals for the U-PDCCH/U-PHICH in the first slot of a subframe of a RB. As illustrated in FIG. 5, there are 46 open REs in the first slot of a RB. Some REs in the second slot (the second 7 symbols) are dedicated reference signals for a control channel in the second slot of a subframe of a RB. There are 58 open REs in the second slot of a subframe of a RB. These counts of open REs depend on a number of factors, such as the number of PDCCH symbols, antenna ports, and the presence or absence of CSI-RS.

In an extreme case, REs in all of the three CRS patterns with frequency shift 0, 1, and 2 are not used for U-PDCCH/U-PHICH transmission. In that case, there are 42 REs in the first slot of a RB and there are 54 REs in the second slot of a subframe of an RB.

There can also be CSI-RS transmission in some REs. In that case, the number of available REs for the U-PDCCH/U-PHICH is lower. The CSI-RS is the reference signal used for channel status indication measurement, for example, CQI feedback measurement and/or report. In this case, there might be few REs available for transmitting the U-PDCCH/U-PHICH. However, transmission of the U-PDCCH/U-PHICH can be aggregated over several resource blocks. In this case, the rate matching and/or resource mapping for the U-PDCCH/U-PHICH also depends on CSI-RS signaling and/or CSI-RS muting signaling. A UE needs to receive CSI-RS signaling and/or CSI-RS muting signaling before decoding the U-PDCCH/U-PHICH.

There can be signaling to indicate which CRS patterns for muting are not used for the U-PDCCH/U-PHICH transmission. The resource elements of the U-PDCCH/U-PHICH can be determined based on the signaling. For example, in the above example, signaling can indicate that the CRS pattern with frequency shift 2 is avoided for U-PDCCH/U-PHICH transmission. The CRS pattern with frequency shift 1 is the CRS of the current cell, thus maintaining orthogonality between the different cells. The CRS pattern with a frequency shift is just for CRS transmission of the current cell and is not used for transmission of any other channels.

An alternative method is that the REs in the symbols with CRS pattern(s) for muting are never used for U-PDCCH/U-PHICH transmission. This can be predefined in a system specification or standard. In this case, there is no need of any additional signaling to signal which CRS patterns to avoid.

When signaling is used to indicate which REs in CRS patterns for muting are not used for U-PDCCH/U-PHICH transmission, the signaling can be UE-dedicated signaling or broadcast signaling. The signaling can inform which CRS patterns for muting are not being used for the new control channel. For example, one CRS pattern for muting is signaled to a UE for not being used for U-PDCCH/U-PHICH transmission in a set of subframes. The CRS pattern for muting may be the CRS pattern of the interference cell to this UE. For a different UE, the interference cell may be different. Hence, the signaled CRS pattern for muting can be different for different UE and/or subframes. For example, for other subframes, a different CRS pattern for muting can be signaled. With this UE dedicated signaling, resource elements of a CRS pattern for muting not being used for the new control channel are only avoided for some UE and/or some subframes. Hence, UE specific dedicated signaling can save overhead due to muting the REs of CRS patterns.

Figure 6:
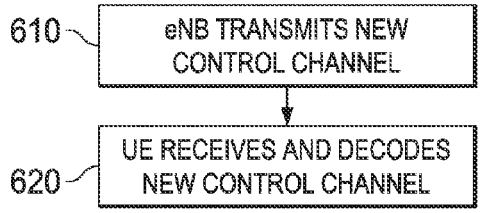
FIG. 6 illustrates a flowchart showing transmission and reception, in accordance with an embodiment.

Turning now to FIG. 6, illustrated is a flowchart in which in block 610 an eNB transmits a U-PDCCH/U-PHICH in the data domain of a subframe, in accordance with an embodiment. In block 620, the UE receives and decodes the U-PDCCH/U-PHICH transmission. The eNB can transmit the U-PDCCH/U-PHICH in a candidate resource block for resource allocation from a set of candidates, for example, in some resource blocks with a pre-defined modulation and coding scheme, such as quadrature phase-shift keyed ("QPSK") modulation and a predefined coding rate. The possible candidates of resource allocation and/or possible modulation/encoding schemes can be predefined in a specification or standard or can be signaled to the UE. The resource allocation and/or modulation/encoding scheme can depend on the CRS patterns not being used for transmission of the new control channel. The UE can blindly detect the possible U-PDCCH candidates with the corresponding resource allocation and/or modulation/coding schemes to find a U-PDCCH. If the cyclic redundancy check ("CRC") passes for a candidate U-PDCCH, the UE detects the new control channel correctly.

There can be signaling or a predefined rule for a UE to determine all the candidates of a U-PDCCH. For example, a signal can indicate the starting RB and the number of RBs (or generally which RBs) for U-PDCCH candidates. The UE can blindly detect each candidate to determine whether a U-PDCCH has been transmitted for the UE. At the eNB side, for a U-PDCCH candidate allocated to a UE, the eNB allocates the REs for a U-PDCCH transmission according to the muting of CRS patterns if any.

Figure 7:
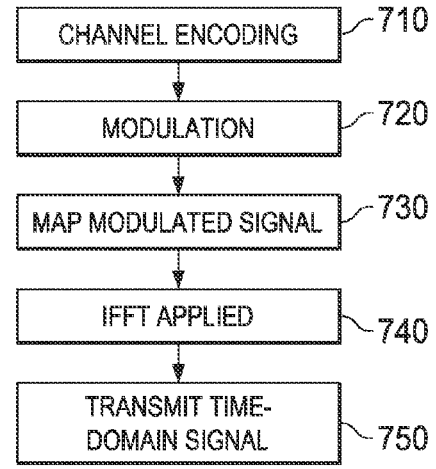
FIG. 7 illustrates a transmission method, in accordance with an embodiment.

Turning now to FIG. 7, illustrated is a flowchart in which in block 710 an eNB encodes the control information for a PDSCH with channel coding, in accordance with an embodiment. Depending on the resource allocation for this control channel, different rate matching can be used. For example, one to four RBs can be allocated for U-PDCCH/U-PHICH transmission, which correspond to different rate matching and a different coding rate. QPSK, in block 720, can be used for modulation. Furthermore, a CRS pattern can be determined as predefined or by signaling not to transmit the U-PDCCH/U-PHICH on RBs allocated to U-PDCCH/U-PHICH of a UE. Next, the modulated signal is mapped in block 730 into resource elements according to a predefined mapping rule. During the process of mapping, REs in the CRS patterns signaled as not being used for the U-PDCCH/U-PHICH transmission should not be used for U-PDCCH/U-PHICH transmission. After the modulated signal is mapped, an inverse fast Fourier transform ("IFFT") in block 740 is applied to transform a signal in the frequency domain to a signal in the time domain. Then, in block 750, the time domain signal is transmitted.

Even though the term CRS patterns is used for REs being muted, this does not mean the REs of the CRS pattern cannot be used for transmission in all of the RBs in the current cell, which is different with CSI-RS muting. Unlike the PDSCH RE muting for CSI-RS, muting REs of a CRS pattern is only applicable to a number of RBs to reduce interference from a CRS of a neighboring cell to the U-PDCCH/U-PHICH. Hence, only for RBs with a U-PDCCH/U-PHICH, the muting of a CRS pattern is applied. Furthermore, this muting is UE-specific. For RBs with another new control for a different UE, the muting of another CRS pattern can be applied. For RBs without a new control channel, the muting may or may not be applied. For example, for a UE with no U-PDCCH/U-

PHICH allocated, data transmission on the allocated RBs may not be muted in REs of CRS patterns. If the muting of the CRS pattern is applied for RBs without U-PDCCH/U-PHICH, the CRS patterns for muting may not be the same as the CRS patterns for muting in other RBs with U-PDCCH/U-PHICH. The eNB needs to determine the CRS patterns for muting for each RB and for multiplex signals of RBs for transmission.

Figure 8:
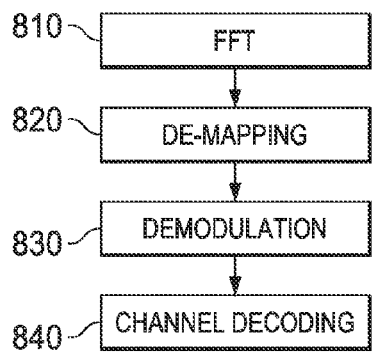
FIG. 8 illustrates a reception method, in accordance with an embodiment.

Turning now to FIG. 8, illustrated is a flowchart in which during reception, in block 810, a fast Fourier transform ("FFT") is used for received signals to transform a time-domain signal into a frequency-domain signal, in accordance with an embodiment. Then, in block 820, de-mapping is used to get the modulated symbols of the control channel in REs of the new control channel. Next, in block 830 demodulation is used, and in block 840 channel decoding is used to obtain the decoded bits. If a cyclic redundancy check passes for the decoded bits, the U-PDCCH has been received correctly.

The control channel can be a U-PDCCH channel or a U-PHICH channel. If the control channel is a U-PHICH channel, one or more bits are modulated by orthogonal codes, such as Walsh code. For example, 1 bit is modulated by an orthogonal code, and the orthogonal code can be (1, 1, 1, 1). Hence, one bit can be modulated in 12 REs with three-time repetition with binary phase shift keyed ("BPSK") or QPSK modulation. (Only an in-phase or quadrature ("I" or "Q") component is used for 1 bit). Another bit can be modulated by an orthogonal code (1, 1, −1, −1) and repeated three times and then transmitted in the same 12 REs without strong interference to the first "1" bit.

The U-PDCCH candidates can be informed to a UE, and the UE can blindly detect the U-PDCCH control channel based on a CRC check. However, for the U-PHICH there may be no CRC in the information bits; thus, the UE cannot decode the U-PHICH based on blind detection. Hence, the resource allocation of the U-PHICH and/or modulation/coding scheme should be signaled to the UE, implicitly or explicitly. For example, the resource allocation of the U-PHICH can be implicitly signaled by the corresponding U-PDCCH. In other words, a PUSCH transmission is indicated by a U-PDCCH transmission. The time-frequency location of the U-PDCCH being detected indicates the resource allocation of the U-PHICH in response to the PUSCH indicated by the U-PDCCH.

Figure 9:
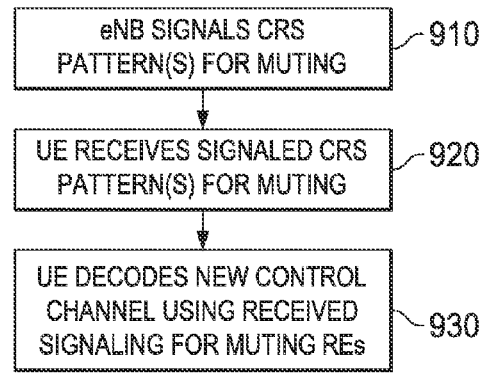
FIG. 9 illustrates reception of CRS signaling, in accordance with an embodiment.

Turning now to FIG. 9, illustrated is a flowchart showing UE reception. The UE may need to know which REs in CRS patterns for muting are not used for new control channel transmission, in accordance with an embodiment. In block 910, an eNB signals the CRS pattern(s) for muting (where the RE on the U-PDCCH/U-PHICH are left blank), and in block 920, the UE receives the signaled pattern(s). In block 930, the UE decodes the new control channel using received signaling for CRS patterns for muting. The CRS pattern(s) for muting determines the resource allocation for the U-PDCCH/U-PHICH, and/or the modulation/coding scheme being used for the U-PDCCH/U-PHICH. Hence, before detecting the U-PDCCH/U-PHICH, the UE first needs to receive the signaling, or according to the predefined resource allocation rule for the new control channel, the UE determines the CRS pattern(s) for muting that are not being used for the new control channel transmission.

For U-PHICH, to save overhead, a U-PHICH of multiple uses can be multiplexed with orthogonal codes as described previously hereinabove. To keep the orthogonal property of different U-PHICH channels in the code domain, the REs used by U-PHICH should be the same for different U-PHICHs. If one U-PHICH has REs different from another U-PHICH, then code orthogonality is lost. An eNB can signal to different UEs the different CRS patterns for muting in which REs are not used for the new type of PHICH transmission. In other words, even in a same RB, different U-PHICH can have REs punctured by different CRS patterns; thus, these U-PHICHs in the same RB cannot be code-division orthogonal. If orthogonality of the code division is to be maintained, the U-PHICH of UEs with the same CRS patterns for muting is arranged in the same RB. In an implementation it complicates the allocation of a U-PHICH for UEs. Therefore, U-PHICH may only use REs that are not in CRS symbols. In other words, REs in all CRS patterns for muting are not used for U-PHICH transmission. With this resource allocation for U-PHICH, the code-division orthogonality property is not impacted by the CRS patterns for muting for avoiding control channel transmission and/or data channel transmission.

For example, signaling can indicate to a UE which REs in a CRS pattern are being muted, but the U-PHICH always uses the same REs regardless of which CRS pattern(s) are signaled. Those same REs are not affected by an OFDM symbol of CRS.

A similar scheme can also be used for U-PDCCH. Hence, REs for U-PDCCH will not be affected by CRS patterns for muting. However, for data channel, in order to have a larger throughput, a signaling can be used to inform which CRS pattern(s) for muting are avoided for data transmission. This signaling can be carried in U-PDCCH or can be higher-layer signaling, for example, by bitmap signaling. If the current cell to transmit the U-PDCCH has a CRS pattern for muting, then the total number of bits for bitmap signaling can be n−1, where n is the total number of CRS patterns in a system for a specific number of antenna ports. If the signaling of CRS pattern(s) for muting of PDSCH is carried on a U-PDCCH, then dynamic cell switching or cell selection can be supported for cooperative multiple point ("CoMP") transmission. Generally, the signaling to indicate muting of REs for a control channel and signaling to indicate muting of REs for a data channel can be different. Even for a U-PHICH channel, a signaling can be informed to a UE for CRS muting in RBs where a U-PHICH is located. Another signaling can be used to inform a UE for RE muting of another channel, such as a data channel, or another channel, such as data channel depending on another predefined rule for CRS muting.

Figure 10:
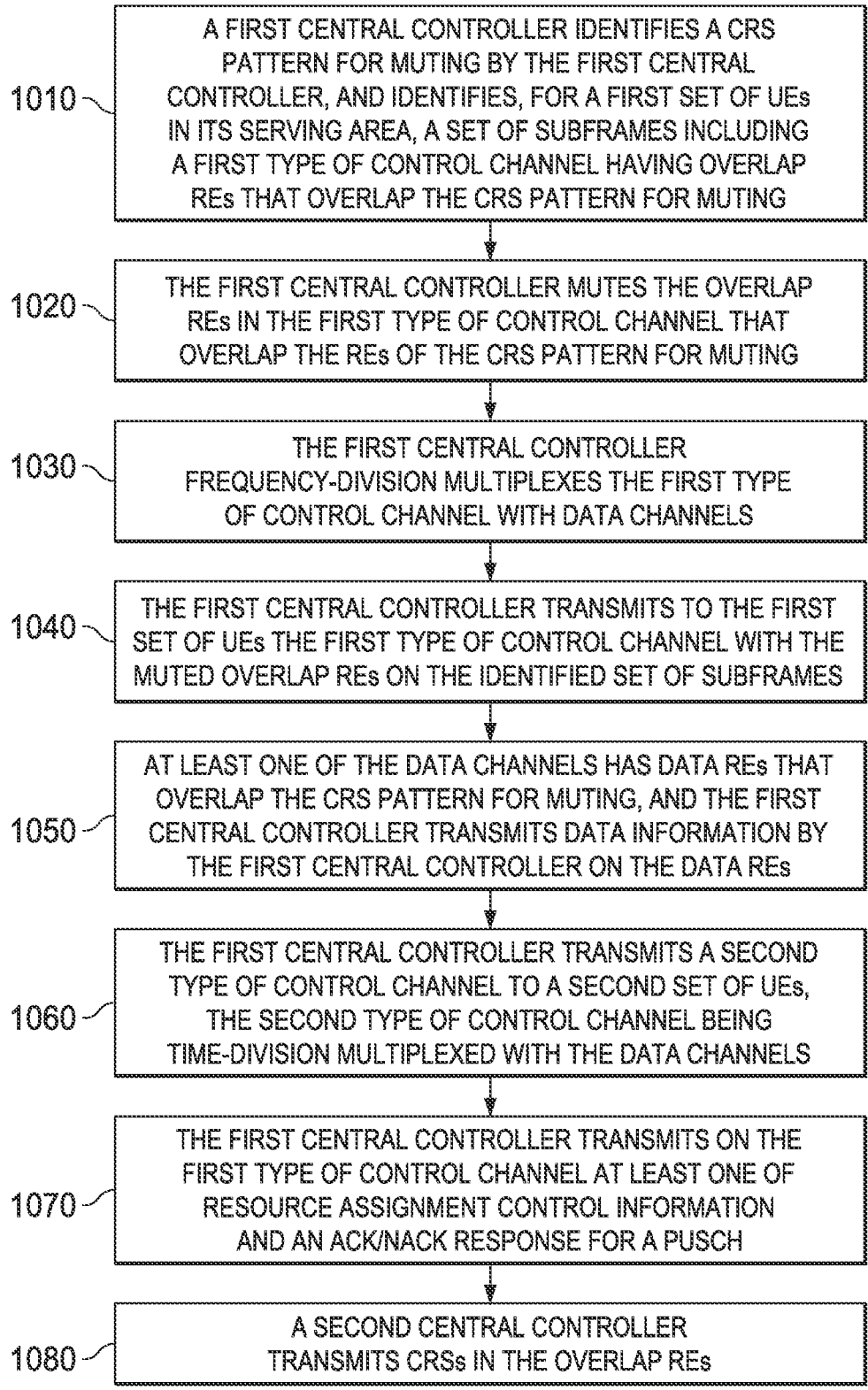
FIG. 10 illustrates a flowchart showing a sequence of steps in a process performed by first and second central controllers operating in a wireless system, in accordance with an embodiment.

Turning now to FIG. 10, illustrated is a flowchart showing a sequence of steps in a process performed by first and second central controllers operating in a wireless system, in accordance with an embodiment. The first and second central controllers are each formed with a processor and a memory coupled to the processor. In block or step 1010, the processor is configured to cause the first central controller to identify, by the first central controller, a CRS pattern for muting by the first central controller, and identify, by the first central controller for a first set of UEs in a serving area of the first central controller, a set of subframes including a first type of control channel having overlap REs that overlap the CRS pattern for muting. The CRS pattern for muting can be signaled or predefined.

In an embodiment, the CRS pattern(s) for muting is signaled by the first central controller by higher-layer signaling which can be RRC signaling. The RRC signaling can be UE-dedicated signaling. In an embodiment, the CRS pattern for which REs are not used for the transmission of the at least one of the resource assignment control information and the CRS pattern for which REs are not used for the ACK/NACK response are independently signaled or predefined. A CRS pattern not to be used for transmitting the first type of control channel can be predefined in a standard or specification, such as a system specification. In an embodiment, a bitmap pattern is used by the first central controller to identify the CRS pattern for muting.

In block or step 1020, the first central controller mutes the overlap REs in the first type of control channel that overlap the REs of the CRS pattern for muting.

In block or step 1030, the first central controller frequency-division multiplexes the first type of control channel with data channels.

In block or step 1040, the first central controller transmits to the first set of UEs, the first type of control channel with the muted overlap REs on the identified set of subframes.

In block or step 1050, at least one of the data channels has data REs that overlap the CRS pattern for muting, and the first central controller transmits data information on the data REs.

In block or step 1060, the first central controller transmits a second type of control channel to a second set of UEs, the second type of control channel being time-division multiplexed with the data channels. The second type of control channel can be transmitted on the muted REs identified by the first central controller for the first set of UEs.

In block or step 1070, the first central controller transmits on the first type of control channel at least one of resource assignment control information and an ACK/NACK response for a PUSCH.

In block or step 1080, a second central controller transmits CRSs in the overlap REs.

Figure 11:
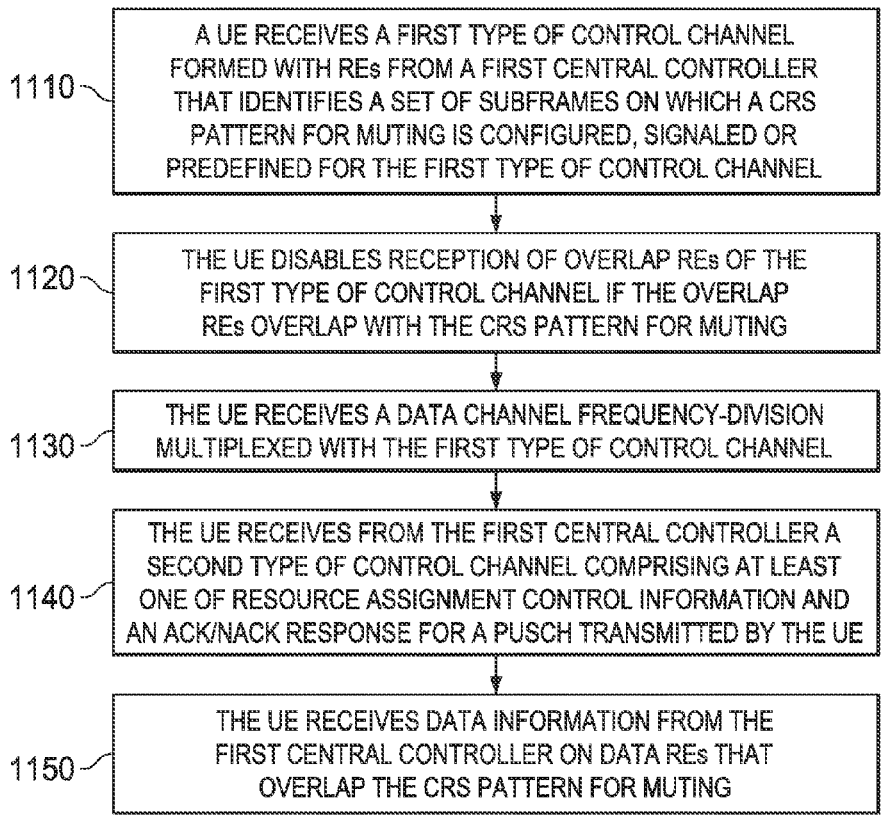
FIG. 11 illustrates a flowchart showing a sequence of steps in a process performed by a UE operating in a wireless system, in accordance with an embodiment.

Turning now to FIG. 11, illustrated is a flowchart showing a sequence of steps in a process performed by a UE operating in a wireless system, in accordance with an embodiment. The UE is formed with a processor and a memory coupled to the processor. In block or step 1110, the processor is configured to cause the UE to receive a first type of control channel from a first central controller in the wireless system identifying a set of subframes on which a CRS pattern(s) for muting is configured, signaled, or predefined for the first type of control channel. A bitmap pattern can be employed by the first central controller to identify the CRS pattern(s) for muting. The CRS pattern can be received by higher-layer signaling which can be RRC signaling. In block or step 1120, the processor is further configured to cause the UE to disable reception of overlap REs of a first type of control channel if the overlap REs of the first type of control channel overlap with REs of the CRS pattern(s) for muting. In block or step 1130, the processor is further configured to cause the UE to receive from the first central controller a data channel frequency-division multiplexed with the first type of control channel. In block or step 1140, the processor is further configured to cause the UE to receive from the first central controller a second type of control channel comprising at least one of resource assignment control information and an ACK/NACK response for a PUSCH transmitted by the UE. In block or step 1150, the processor is further configured to receive data information from the first central controller on data REs that overlap the CRS pattern for muting.

The UE can receive the first type of control channel in a first subframe and the second type of control channel in a second subframe.

Thus, as introduced herein, a second type of control channel is transmitted in addition to a first type of control channel, and the second type of control channel is characterized in that overlap REs in a CRS pattern(s) for muting are not used for transmission of the second type of control channel, while the first type of control has no such constraint about CRS pattern(s) for muting.

The control channel can be a control channel to carry the control information of PDSCH/PUSCH or a control channel to carry ACK/NACK information for PUSCH. There can be signaling by an eNB/base station to indicate the CRS pattern(s) for muting not being used for the second type of control channel. The CRS pattern(s) for muting not being used for the second type of control transmission can be configured by the controller or predefined in the specification or standard.

The signaling can be UE-dedicated signaling. The signaling can inform different CRS pattern(s) for muting for different subframes and/or different UEs. Furthermore, the REs in signaled CRS pattern(s) for muting may not be used for PDSCH transmission either. The REs in signaled CRS pattern(s) for muting can be used for PDSCH transmission.

A reception method is introduced for a control channel, including detecting a first type of control channel in a first subframe and detecting a second type of control channel in a second subframe where REs in a CRS pattern(s) for muting is not used for transmission of a second type of control channel. The UE can receive a signal indicating a CRS pattern(s) for muting in which REs are not used for the transmission of the second type of control channel. The UE can determine a CRS pattern for muting in which REs are not used for the transmission of the second type of control channel based on a signaled rule or a predefined rule specified in a standard. The UE can determine the code rate and/or rate matching of the second control channel according to the CRS pattern(s) not being used for transmission of the second type of control channel.

An equipment of transmission or reception has means for the methods of transmission or reception described hereinabove.

In an embodiment, a reception method of a control channel is provided. The method can include detecting a first type of control channel in a first subframe and detecting a second type of control channel in a second subframe where REs in a CRS pattern are not used for transmission of a second type of control channel.

The UE can receive a signal indicating a CRS pattern in which REs are not used for the transmission of the second type of control channel. The UE can determine a CRS pattern in which REs are not used for the transmission of the second type of control channel based on a predefined rule specified in a standard or specification. The UE can determine the code rate and/or rate matching of the second control channel according to the CRS pattern(s) not being used for transmission of the second type of control channel.

An equipment of transmission or reception can perform and/or have the means for the methods of transmission or reception described hereinabove.

In another embodiment, a method for a primary node to send control information to a remote node is provided. The method can include notifying the remote node of a set of resources on a fraction of the resources used for transmission by the primary node and transmitting control channel information to the remote node while keeping the set of resources free of transmission. The set of resource can be specific to the remote node.

It is noted that, unless indicated otherwise, all functions described herein can be performed in either hardware or software, or some combination thereof, with or without human intervention. In an embodiment, however, the functions are performed by a processor (e.g., a computer or an electronic data processor), such as that discussed below with reference to FIG. 12, in accordance with code such as computer program code, software, and/or integrated circuits that are coded to perform such functions, unless indicated otherwise.

Figure 12:
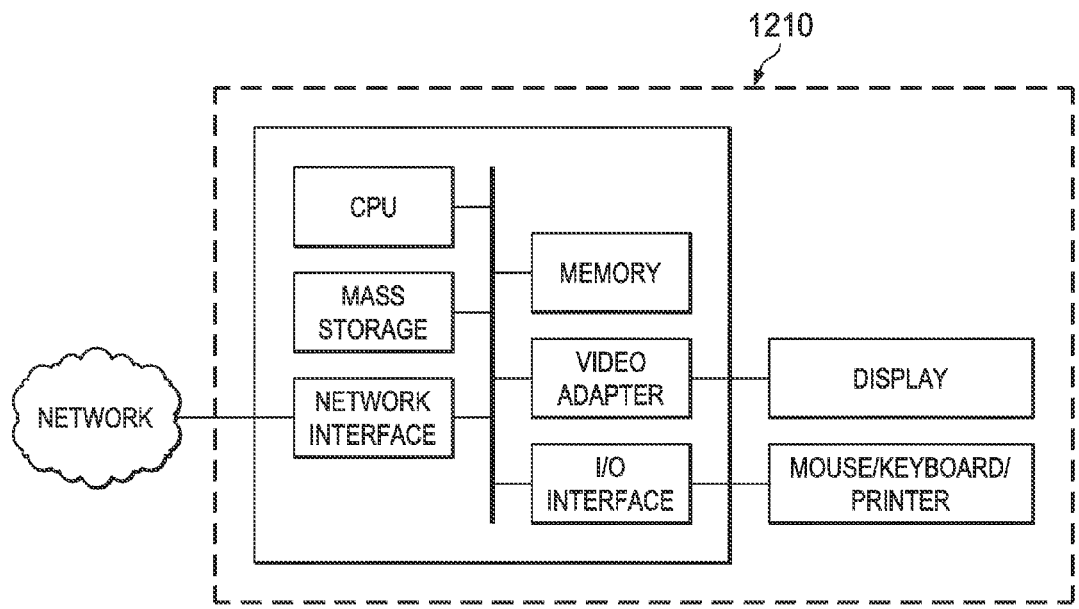
FIG. 12 illustrates a block diagram of a processing system that can be used to perform one or more of the processes discussed herein in accordance with an embodiment.

Referring now to FIG. 12, illustrated is a block diagram of a processing system that can be used to perform one or more of the processes discussed above in accordance with an embodiment. The processing system can be formed with a processing unit 1210 equipped with one or more input/output devices, such as a mouse, a keyboard, printer, or the like, and a display. The processing unit 1210 can include a central processing unit ("CPU"), memory, a mass storage device, a video adapter, and an I/O interface connected to a bus.

The bus can be one or more of any type of several bus architectures including a memory bus or memory controller, a peripheral bus, video bus, or the like. The CPU can be formed with any type of electronic data processor. The memory can be formed with any type of system memory such as static random access memory ("SRAM"), dynamic random access memory ("DRAM"), synchronous DRAM ("SDRAM"), read-only memory ("ROM"), non-volatile RAM ("NVRAM"), a combination thereof, or the like. In an embodiment, the memory can include ROM for use at boot-up, and DRAM for data storage for use while executing programs.

The mass storage device can be formed with any type of storage device configured to store data, programs, and other information and to make the data, programs, and other information accessible via the bus. The mass storage device can be formed with, for example, one or more of a hard disk drive, a magnetic disk drive, an optical disk drive, or the like.

The video adapter and the I/O interface provide interfaces to couple external input and output devices to the processing unit. Examples of input and output devices include the display coupled to the video adapter and the mouse/keyboard/printer coupled to the I/O interface. Other devices can be coupled to the processing unit, and additional or fewer interface cards can be utilized. For example, a serial interface card (not shown) can be used to provide a serial interface for a printer.

The processing unit can also include a network interface which can be a wired link, such as an Ethernet cable or the like and/or a wireless link. The network interface allows the processing unit to communicate with remote units via the network. In an embodiment, the processing unit is coupled to a local-area network or a wide-area network to provide communications to remote devices, such as other processing units, the Internet, remote storage facilities, or the like.

It should be noted that the processing system can include other components. For example, the processing system can include power supplies, cables, a motherboard, removable storage media, cases, and the like. These other components, although not shown, are considered part of the processing system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a wireless system, the method comprising:
   selecting, by a first central controller, a common reference signal ("CRS") pattern for muting on a first type of control channel by the first central controller, the first type of control channel formed with resource elements ("REs");
   identifying, by the first central controller for a first set of user equipments ("UEs") in a serving area of the first central controller, a set of subframes including the first type of control channel, the set of subframes having REs that overlap the CRS pattern for muting;
   muting the overlapping REs in the first type of control channel;
   frequency-division multiplexing the first type of control channel with data channels; and
   transmitting, by the first central controller to the first set of UEs, the first type of control channel with the muted REs on the identified set of subframes.

2. The method as recited in claim 1 wherein the CRS pattern for muting is predefined for the first type of control channel.

3. The method as recited in claim 1 further comprising transmitting CRSs by a second central controller in the overlapping REs.

4. The method as recited in claim 1, further comprising:
   time-division multiplexing by the first central controller a second type of control channel with the data channels; and
   transmitting the second type of control channel by the first central controller to a second set of UEs.

5. The method as recited in claim 1, wherein at least one of the data channels has data REs that overlap the CRS pattern for muting, and wherein the method further comprises transmitting data information by the first central controller on the data REs.

6. The method as recited in claim 1 further comprising signaling the CRS pattern for muting by the first central controller by higher-layer signaling.

7. The method as recited in claim 6 wherein the higher-layer signaling comprises radio resource control ("RRC") signaling.

8. The method as recited in claim 7 wherein the RRC signaling is UE-dedicated signaling.

9. The method as recited in claim 1 further comprising transmitting on the first type of control channel at least one of resource assignment control information and an acknowledgment/negative acknowledgment ("ACK/NACK") response for a physical uplink shared channel ("PUSCH").

10. The method as recited in claim 9 wherein the CRS pattern for muting on the first type of control channel when the first type of control channel is used for transmitting the resource assignment control information is selected independently from the CRS pattern for muting selected on the first type of control channel when the first type of control channel is used for transmitting the ACK/NACK response for the PUSCH.

11. The method as recited in claim 9 further comprising independently predefining the CRS pattern for muting for which REs are not used for the transmitting the at least one of the resource assignment control information and the CRS pattern for muting for which REs are not used for the ACK/NACK response.

12. The method as recited in claim 1 wherein the CRS pattern for muting is predefined in a standard.

13. The method as recited in claim 1 further comprising using a bitmap pattern by the first central controller for identifying the CRS pattern for muting.

14. A user equipment comprising:
   a memory; and
   a processor coupled to the memory, the processor configured to:
     receive, from a first central controller, a first type of control channel formed with resource elements ("REs"), the first central controller having selected a CRS pattern for muting on the first type of control channel, and having identified a set of subframes having the first type of control channel, the set of subframes having REs that overlap the CRS pattern for muting, and the first central controller having muted the overlapping REs in the first type of control channel, disable reception of the muted REs of the first type of control channel, and receive a data channel frequency-division multiplexed with the first type of control channel.

15. The user equipment as recited in claim 14 wherein the CRS pattern for muting is predefined for the first type of control channel.

16. The user equipment as recited in claim 14 wherein a bitmap pattern is employed to identify the CRS pattern for muting.

17. The user equipment as recited in claim 14 wherein the processor is further configured to receive from the first central controller a second type of control channel comprising at least one of resource assignment control information and an ACK/NACK response for a PUSCH transmitted by the UE.

18. The user equipment as recited in claim 14 wherein the processor is further configured to receive the CRS pattern for muting by higher-layer signaling.

19. The user equipment as recited in claim 18 wherein the higher-layer signaling comprises RRC signaling.

20. The user equipment as recited in claim 14 wherein the processor is further configured to receive the first type of control channel in a first subframe and a second type of control channel in a second subframe.

21. The user equipment as recited in claim 14, wherein the data channel has data REs that overlap the CRS pattern for muting, and wherein the processor is further configured to receive data information from the first central controller on the data REs.

22. A central controller comprising:

a memory; and a processor coupled to the memory, the processor configured to cause the central controller to:

select a common reference signal ("CRS") pattern for muting on a first type of control channel by the central controller, the first type of control channel formed with resource elements ("REs"), identify, for a first set of user equipments ("UEs") in a serving area of the central controller, a set of subframes including the first type of control channel, the set of subframes having REs that overlap the CRS pattern for muting, mute the overlapping REs in the first type of control channel, frequency-division multiplex the first type of control channel with data channels, and transmit, to the first set of UEs, the first type of control channel with the muted REs on the identified set of subframes.

23. The central controller as recited in claim 22 wherein the processor is further configured to transmit data information on the data channel on one of the muted REs of the first type of control channel.

24. A method for operating a UE, comprising:

receiving, from a first central controller, a first type of control channel formed with resource elements ("REs"), the first central controller having selected a CRS pattern for muting on the first type of control channel, and having identified a set of subframes having the first type of control channel, the set of subframes having REs that overlap the CRS pattern for muting, and the first central controller having muted the overlapping REs in the first type of control channel;

disabling reception of the muted REs of the first type of control channel; and receiving a data channel frequency-division multiplexed with the first type of control channel.

* * * * *

UNITED STATES PATENT AND TRADEMARK OFFICE
CERTIFICATE OF CORRECTION

| | | |
|---|---|---|
| PATENT NO. | : 8,811,285 B2 | Page 1 of 1 |
| APPLICATION NO. | : 13/396529 | |
| DATED | : August 19, 2014 | |
| INVENTOR(S) | : Bingyu Qu et al. | |

It is certified that error appears in the above-identified patent and that said Letters Patent is hereby corrected as shown below:

On the Title Page, item (75) Inventors, line 2, delete "Xieo" and insert --Xiao--.

Signed and Sealed this
Twenty-first Day of October, 2014

Michelle K. Lee
*Deputy Director of the United States Patent and Trademark Office*